United States Patent [19]
Croix-Marie et al.

[11] 3,844,218
[45] Oct. 29, 1974

[54] GROUND EFFECT GUIDING MEANS FOR A TRACKED VEHICLE

[75] Inventors: Francis Marie Jean Croix-Marie, Viry Chatillon; Christian Pierre Bonnat, Gometz-Le-Chatel; Jean-Pierre Georges Denis Morel, Jouars-Pontchartrain, all of France

[73] Assignee: Bertin & Cie, Plaisir, France

[22] Filed: Dec. 14, 1972

[21] Appl. No.: 315,192

[30] Foreign Application Priority Data
Dec. 17, 1971 France .................. 71.45567

[52] U.S. Cl. .................. 104/23 FS, 104/134
[51] Int. Cl. .................. A63g 1/00
[58] Field of Search .................. 104/23 FS, 134

[56] References Cited
UNITED STATES PATENTS
| | | | |
|---|---|---|---|
| 3,164,103 | 1/1965 | Lathers et al. | 104/23 FS |
| 3,602,147 | 8/1971 | Burwell | 104/23 FS |
| 3,625,157 | 12/1971 | Burwell | 104/23 FS |

FOREIGN PATENTS OR APPLICATIONS
| | | | |
|---|---|---|---|
| 1,917,228 | 10/1969 | Germany | 104/23 FS |

*Primary Examiner*—Robert G. Sheridan
*Assistant Examiner*—R. Johnson
*Attorney, Agent, or Firm*—A. W. Breiner

[57] ABSTRACT

The invention comprehends ground effect guiding means for a machine moving along a track having at least one guiding surface having a vertical component, the machine having a structure having one surface near the guiding surface, the guiding means comprising means for bounding fluid cushion enclosures between the machine structure and the guiding surface, said structure bearing on said surface by way of said enclosures, the enclosures together forming at least one group in turn consisting of at least two fluid cushion enclosures disposed in consecutive relationship lengthwise of the machine; means for bounding a respective deformable chamber between the machine structure surface and the or each group of fluid cushion enclosures, and means for securing all the fluid cushion enclosures of the or each group to their respective chamber; means for supplying fluid to the fluid cushion enclosures; and means for supplying fluid to the or each deformable chamber.

23 Claims, 9 Drawing Figures

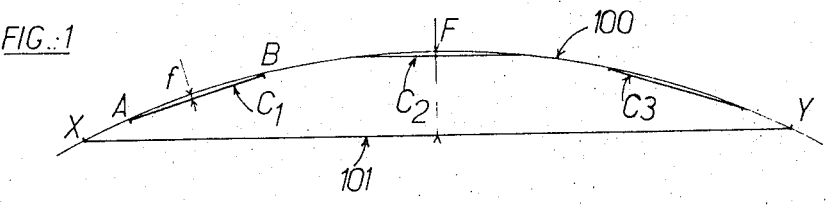
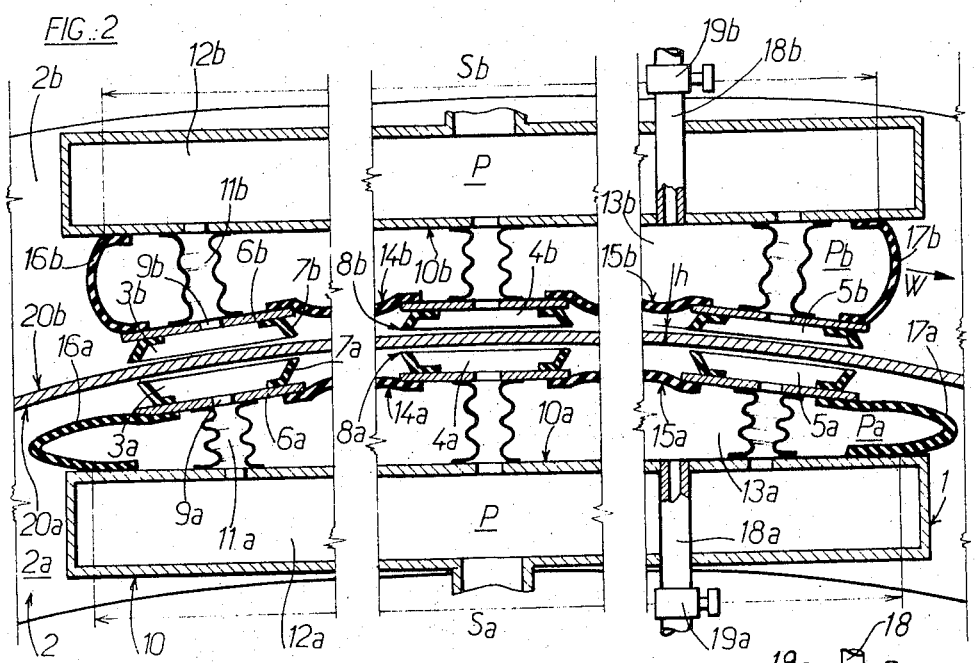
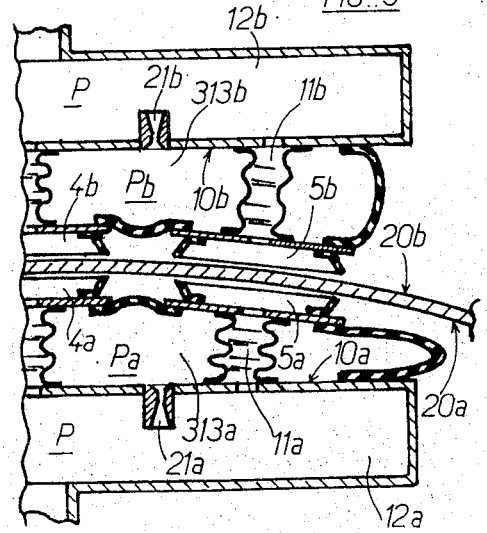
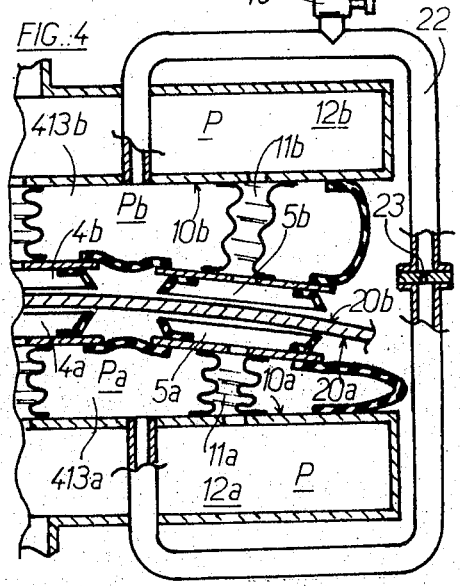

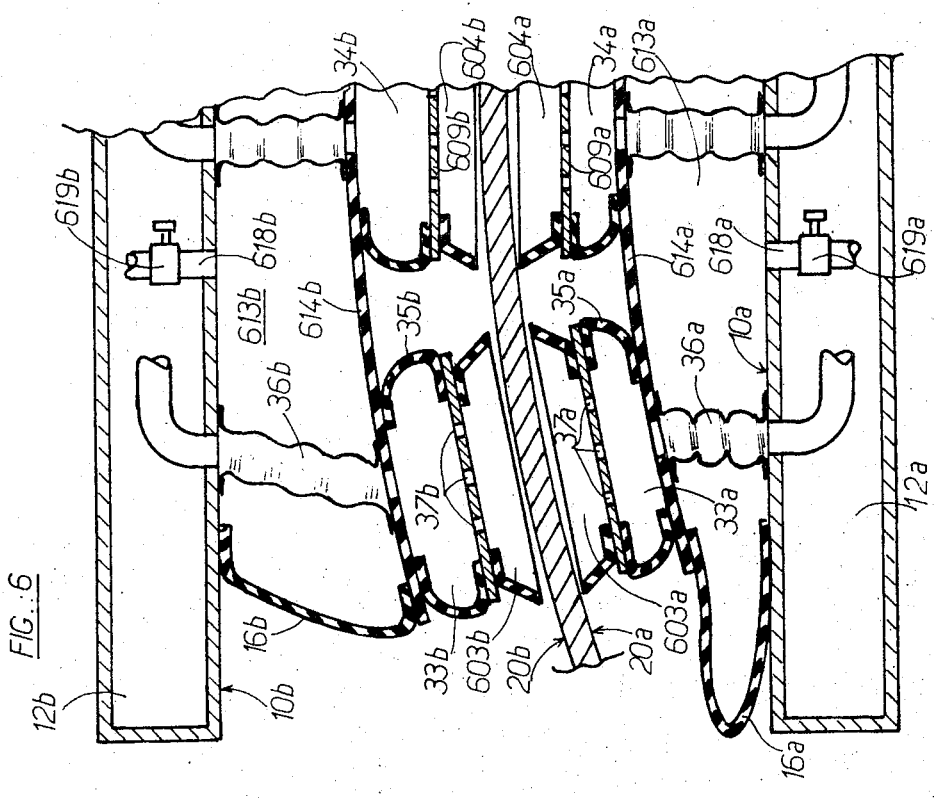
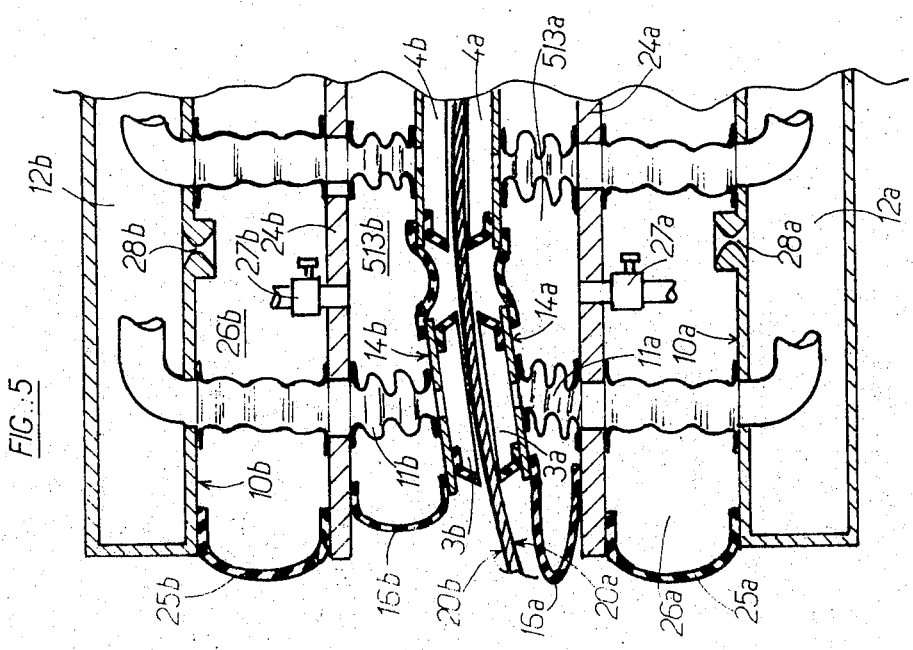

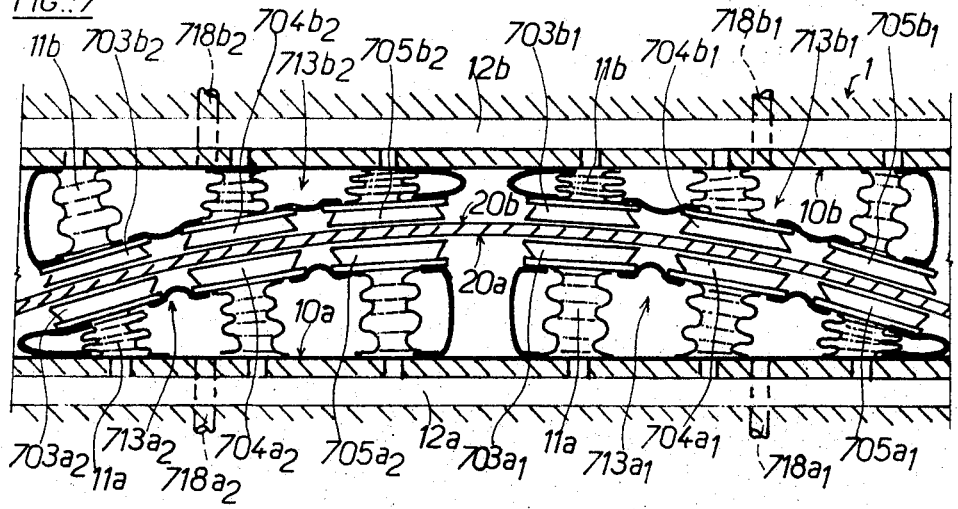
FIG.:7
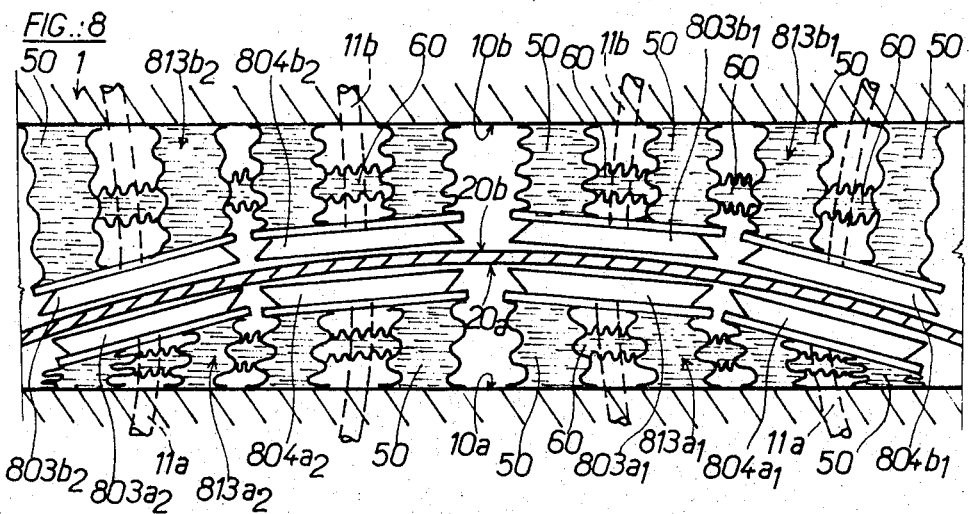
FIG.:8
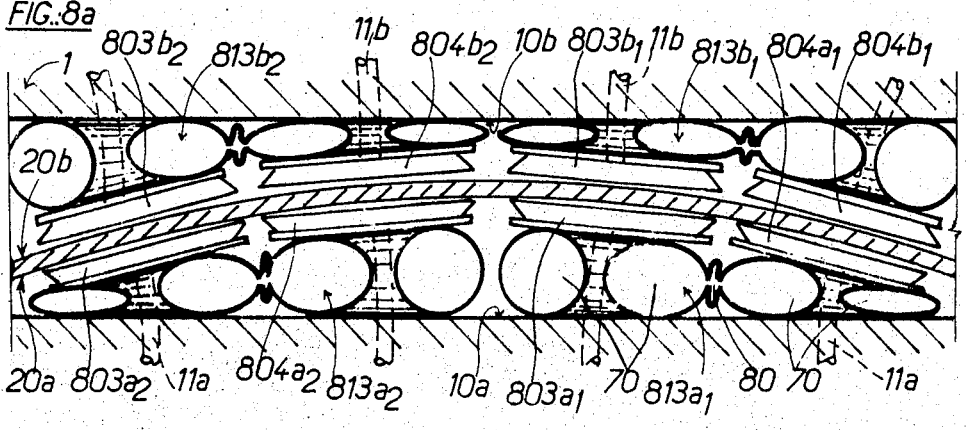
FIG.:8a

GROUND EFFECT GUIDING MEANS FOR A TRACKED VEHICLE

This invention relates to ground effect guiding means for a machine moving along a track having at least one guiding surface having a vertical component, the machine having a structure having one surface near the guiding surface, the guiding means being of the kind comprising fluid cushion enclosures via which the structure bears on the bearing surface of the guiding means, such enclosures cooperating to form at least one group of fluid pressure cushions, such group comprising at least two such enclosures disposed consecutively lengthwise of the machine.

Such guiding means serve, of course, to transmit lateral forces such as are caused by wind or by centrifugal force when the vehicle is negotiating a curve. Tracks providing this kind of guidance are of familiar shape, being in cross-section e.g. U-shaped, inverted T-shaped, L-shaped and so on.

Hereinafter a distinction will be made between "sway" and "yawing". Sway tends to shift the complete machine parallel to a given direction, as is the usual case with wind forces, while yawing forces tend to turn the machine around a vertical axis, more particularly on curved portions of track. A machine subjected to these forces tends to shift laterally while continuing to be guided by the track. These shifts cause often abrupt and differential changes in cushion operating conditions, with the result that there may be considerable local stressing of the machine structure.

Also, when machines of this kind are required to carry passengers and possibly fragile freight, comfort is an important consideration and depends inter alia on how the machine reacts to the forces applied to it. In this connection the rate of variation of the forces applied to the machine must be considered, and so we shall distinguish between dynamic behaviour (high rate of variation) and static, or steady state, behaviour (little if any rate of variation).

The negotiation of curves, more particularly sharp-radius curves, leads to special problems with machines of this kind, and reference will be made in this connection to FIG. 1 which is a diagrammatic plan view of a system embodied by a track and a machine moving therealong. The track represented by an arc has at least one guiding surface 100 which is either vertical or has a vertical component. The machine represented by a chord XY, has a structure 101 which is borne by surface 100 with the interposition of a number of fluid cushions $C_1$, $C_2$, $C_3$ and so on each represented by a chord, as AB. The term "general versin" will be applied to the distance or gap F between chord XY and arc XY. The gap F is governed by machine length and the radius of track curvature. The term "cushion versin" will be applied to the distance or gap $f$ between the chord AB and the arc AB. The gap $f$ is determined by cushion length and the radius of track curvature.

By the nature of the design of the machine, narrow-radius curves give rise to a number of limitations. The first concerns guide cushion dimensioning. The guide cushions cannot be over-large unless the distance $f$ — and therefore the clearance between the cushions and the track — increases beyond what is compatible with correct operation of the cushions. A second limitation is the need for every cushion to be individually orientable by a swivelling movement relatively to the track.

A third limitation is linked with the existence of the gap F, which may be very considerable and which must be taken up. Each cushion must therefore be mounted on a long-travel suspension correction system, with the implication that such system must have weak local rigidity in steady and dynamic conditions. The problem is particularly critical in the case of a central cushion, as $C_2$; it is very desirable to have a central cushion since the same always stays parallel to the machine structure — the best position for holding the machine towards the centre of track curvature. A fourth limitation arises because the machine has to bear on the guiding surface by way of a suspension system whose overall-stiffness, at least dynamically, is high enough for acceptable comfort.

It is a general object of the invention to comply with these limitations, to provide a satisfactory distribution in the transmission of the guiding forces to the machine structure and to enable all cushions to operate in comparable conditions.

According to the invention, therefore, guiding means of the kind hereinbefore set forth comprise, between that surface of the machine structure which is near the guiding surface and the group of fluid cushion enclosures, a fluid-inflated deformable chamber to which all the fluid cushion enclosures of such group are secured. The pressure in the deformable chamber is therefore substantially the same everywhere, at least in steady state operating conditions.

As will be described hereinafter, one advantage of such a chamber is that it has a high stiffness overall, which helps comfort, but reduced stiffness locally, making for ready compensation for the general versin of the machine and for individual swivelling orientation of each cushion. Another result of equal pressure throughout the chamber, at least in steady-state conditions, is that the bearing force provided by each individual cushion is the same, thus precluding inter alia the risk of locally concentrated guiding forces on a particular part of the machine structure or on a particular cushion. There is therefore little risk of the clearance between a cushion and the track decreasing below a predetermined limit.

Features and advantages of the invention will become apparent from the following description of some embodiments thereof, given by way of example only, reference being made to the accompanying drawings, in which:

FIG. 1 is a diagrammatic view, to which reference has already been made, showing in plan the relative relationship of a machine and a track along which the machine is required to move;

FIG. 2 is a view in horizontal section of a machine moving along a track and having a first embodiment of guiding means according to the invention, and FIGS. 3 to 8a are fragmentary sectional views of alternative forms of the guiding means shown in FIG. 2.

Referring to FIG. 2, a machine 1 is adapted to move along a track 2 which is in cross-section e.g. of the inverted-T kind with two bearing surfaces 2a, 2b which are horizontal or which have a horizontal component and which are adapted to bear the weight of the machine, e.g. by way of fluid cushions (not shown), the track having also two oppositely disposed guiding surfaces 20a, 20b which are vertical or which have a vertical component and which serve to guide the machine and to deal with lateral forces, including, inter alia sway and yawing forces, acting on the machine.

The machine 1 has a structure 10 with two surfaces 10a, 10b, surface 10a being near track surface 20a and machine surface 10b being near track surface 20b. Disposed between each machine surface 10a, 10b and the associated guiding surface 20a, 20b is a group of at least two fluid cushion enclosures. As shown each group comprises three enclosures 3a, 4a, 5a and 3b, 4b, 5b via which the machine structure 10 bears on the guiding surfaces 20a, and 20b respectively. The fluid cushion enclosures are disposed consecutively lengthwise of the machine and are of reduced dimensions; consequently, on a curve their cushion gap $f$ is small. Each enclosure is bounded inter alia by a rigid or semi-rigid end member 6a or 6b and by a peripheral containing skirt 7a or 7b having a free edge 8a or 8b separated from the guiding surface 20a or 20 b by a leakage clearance $h$ (see FIG. 2). The end member 6a or 6b of each enclosure is pierced with at least one passage 9a or 9b which communicates via a deformable duct 11a or 11b with a manifold or the like 12a or 12b for supplying fluid at a pressure P.

A deformable inflatable chamber 13a or 13b is interposed between each of the machine structure surfaces 10a and 10b and the fluid cushion enclosures. Each chamber 13a or 13b is common to its associated enclosure group 3a, 4a, 5a or 3b, 4b, 5b which is near the corresponding guiding surface 20a or 20b, and the fluid cushion enclosures are secured to the particular associated chamber 13a or 13b concerned. On its side near the track the deformable chamber 13a or 13b is bounded by a deformable longitudinal partition 14a or 14b comprising rigid or semirigid portions — embodied by the ends 6a or 6b of the enclosures 3a or 3b — interconnected by flexible portions 15a or 15b. On the machine structure side the chambers are bounded by a rigid longitudinal wall which may be the structure surface 10a or 10b. The two longitudinal walls 14a, 10a or 14b, 10b which bound each respective chamber are interconnected by two flexible diaphragms, one 16a or 16b of which is at the rear of the machine and the other one 17a or 17b of which is at the front of the machine. The diaphragms are adapted to bear on the rigid partition 10a or 10b along a contact surface which changes progessively in response to deformations of the chamber 13a or 13b.

The chambers are inflated e.g. through lines 18a, 18b each comprising a respective valve 19a or 19b, with an appropriate fluid which is advantageously of the same nature as the fluid used for the cushions. After inflation the valves 19a, 19b are closed to give a substantially sealing-tight closure of the chambers. As FIG. 2 shows, the shape thereof is variable, as is the area $S_a$ or $S_b$ over which the chambers bear on their respective rigid partitions 10a or 10b. The pressure throughout the interior of the deformable chamber is substantially the same.

The guiding means according to the invention operate as follows:

In steady condition the cushions 3a, 4a, 5a or 3b, 4b, 5b each take up a position relatively to the respective guiding surface 20a or 20b such that their pressure is balanced by the pressure $P_a$ or $P_b$ in the deformable chamber 13a or 13b, the leakage clearance $h$ of the cushions being inversely proportional to the pressure in their associated chamber.

Consideration will first be given to sway-producing forces. Such forces are applied to the complete machine and are transmitted, via the system comprising the chamber 13a or 13b on the side of the machine to which the forces are applied and the associated cushions, to the corresponding guiding surface 20a or 20b of the track. The chamber, therefore, tends to be uniformly compressed and to have its internal pressure increase, with the result that all the cushions tend to shift towards a new equilibrium position. Since the volume variation of the chamber is effective for the whole of the chamber and since the area via which the chamber bears on the machine structure 10 is high and increases in proportion as compression or squeezing increases, overall transverse movement of the machine structure remains small. In all, therefore, in both steady and dynamic conditions the deformable chamber behaves like a very stiff suspension chamber, of course with the result of passenger comfort.

Considering now yawing such as occurs when the vehicle is negotiating a curve, when the machine, moving in the direction indicated by an arrow W, approaches a curve the front cushion 5a is the first to move towards the guiding surface 20a. Reduction of the leakage clearance $h$ of the front cushion 5a causes the cushion pressure therein and consequently the force applied by the cushion 5a locally to the deformable chamber 13a to increase. The chamber 13a, therefore, deforms locally until the leakage clearance $h$ of the cushion 5a has substantially regained its initial value. Advantageously, the cushions used in such a machine are of the autostable kind — i.e., cushions whose volume V and pressure $p$ so vary that:

$$dV/dp < 0$$

Cushions having this feature have been disclosed e.g. in the applicants' French Pat. Nos. 1,442,532 and 1,602,658.

The local deformation of the deformable chamber slightly alters the volume thereof; however, the volume variation affects only a relatively limited surface of the chamber and so the swivelling displacement of the cushion can be considerable. The deformable chamber therefore behaves locally (and not overall as in the case of swaying) like a "soft" suspension chamber so that each cushion can "stick" to its associated track guiding surface. Each cushion can therefore in turn take up the gap F of FIG. 1 and can orient itself individually relatively to the track by a swivelling motion.

The local volume variation of the deformable chamber can be compensated for by an opposite variation of the volume of another portion of the chamber so that the total volume of the chamber can stay unchanged. However, the pressure inside the chamber is the same throughout; consequently, all the cushions associated with the chamber act with bearing forces of the same order, however they may be positioned or oriented. The guiding forces are therefore distributed statisfactorily to the machine structure.

It can be shown that in steady conditions there is always a single position of the machine relative to the track such that the total volume of the deformable chamber remains substantially constant on a curve or at the start of a curve.

In dynamic conditions any volume variation of the deformable chamber causes a pressure variation in the whole chamber, and so the stiffness thereof may vary briefly. For instance, in steady-state conditions — i.e., when the entire machine is on the curved portion of the track — advantage can be taken of the slight total compression of the inside deformable chamber 13a due to centrifugal force acting on the machine to increase the stiffness thereof, and vice versa for the outside chamber 13b.

Similarly, at the beginning of a curve the front cushion 5a or 5b acts on the whole machine by way of its associated deformable chamber, the same acting like an amplifier. Consequently, all the cushions act in unison to shift the machine transversely and to rotate the same to change its direction. Another feature is that variations of the areas $S_a$ or $S_b$ due to transverse movement at the front and/or back of the machine lead to the appearance of a resilient force producing a restoring yaw in optimum conditions.

FIG. 3 shows another guiding means differing from the previous guiding means only in the manner in which the deformable chambers 313a, 313b are inflated. In FIG. 3 the manifolds 12a, 12b simultaneously supply pressure fluid to their respective cushions 3a, 4a, 5a and 3b etc., via the lines 11a or 11b, and to their respective chambers 313a or 313b via a calibrated orifice or a convergent-divergent device 21a or 21b. In steady conditions the pressure $P_a$ or $P_b$ in each chamber 313a, 313b is equal to the supply pressure P in its respective manifold 12a or 12b. In dynamic conditions the passage 21a or 21b acts as a constriction. Consequently, the overall dynamic stiffness of the chambers 313a, 313b is substantially equal to the overall dynamic stiffness of the chambers 13a or 13b or FIG. 2, but the overall stiffness in steady conditions is much less in the case of FIG. 3 than in the case of FIG. 2. The system shown in FIG. 3 provides excellent damping but at the cost of increased transverse displacement of the machine as a result of possible steady-state lateral forces.

In the guiding means shown in FIG. 4, deformable chambers 413a, 413b associated with machine structure surfaces 10a, 10b respectively communicate with one another via a communicating line 22 comprising a calibrated orifice or passage 23. The deformable chambers 413a, 413b are inflated through a line 18 having a valve 19. As in the case of FIG. 3 the overall stiffness of each chamber is high in dynamic conditions and relatively low in steady static conditions.

FIG. 5 shows another guiding means, wherein each deformable chamber 513a or 513b is bounded on the side near the machine structure by a rigid longitudinal partition 24a or 24b adapted to move transversely and adapted, in cooperation with machine structure surface 10a or 10b and a flexible diaphragm 25a or 25b, to bound an auxiliary deformable compartment 26a or 26b connected to the compartment 513a or 513b by a communicating orifice 27a or 27b, which may be adjustable, and to the manifold 12a or 12b by way of a calibrated supply orifice 28a or 28b. This arrangement provides two-stage suspension giving good damping, with relatively high overall stiffness in dynamic conditions and relatively low overall stiffness in steady conditions.

FIG. 6 shows another guiding means comprising deformable chambers 613a, 613b and, bounding the same on the side near the track, deformable partitions 614a, 614b respectively. In contrast to what has so far been disclosed, fluid cushions 603a, 604a, etc., and 603b, 604b, etc., are secured to the deformable partition not directly but by way of individual deformable enclosures 33a, 34a, etc., and 33b, 34b, etc.; the same are bounded laterally by flexible diaphragms 35a, or 35b and communicate via flexible lines 36a or 36b with the pressure fluid supply manifold 12a or 12b and communicate with the cushion interiors by way of orifices 37a and 37b which extend through respective end members 609a and 609b of the cushions 603a, 604a, etc., and 603b, 604b etc., and which are advantageously calibrated. The deformable chambers can be supplied in the manner shown either independently, through a line 618a or 618b having a valve 619a or 619b, or directly from the manifold 12a or 12b. In contrast to the previous guiding means, the guiding means shown in FIG. 6 has a completely flexible deformable partition 614a or 614b embodied by an assembly of rigid or semi-rigid parts interconnected by flexible parts. As in the case of FIG. 5, the guiding means shown in FIG. 6 provides a two-stage suspension.

The guiding means shown in FIG. 7 is similar to the guiding means shown in FIG. 2 except that in FIG. 7 the fluid cushion enclosures on each side of the machine are distributed in two groups disposed in consecutive relationship lengthwise of the machine, the two groups being a "front" group $703a_1$, $704a_1$, $705a_1$ ($703b_1$, $704b_1$, $705b_1$) and a "rear" group $703a_2$, $704a_2$, $705a_2$ ($703b_2$, $704b_2$, $705b_2$), each group thus being the equivalent of a bogie. A deformable inflatable chamber $713a_1$ or $713b_1$ and $713a_2$ or $713b_2$ similar to the deformable chamber 13a or 13b of FIG. 2 and associated with a respective inflation line $718a_1$ or $718b_1$, and $718a_2$ or $718b_2$ is disposed between each group and one of the machine structure surfaces 10a or 10b.

FIG. 8 discloses another guiding means comprising two cushion groups on each side of the machine — a front group $803a_1$, $804a_1$ ($803b_1$, $804b_1$) and a rear group $803a_2$, $804a_2$ ($803b_2$, $804b_2$). A deformable inflatable chamber $813a_1$ or $813b_1$ and $813a_2$ or $813b_2$ is disposed between each group and one of the machine structure surfaces 10a or 10b. each chamber, e.g. the chamber $813b_1$, is in this case embodied by a combination of more than one, e.g. four, elementary deformable chambers such as bellows or flexible pockets 50 disposed in consecutive relationship lengthwise of the machine and intercommunicating by way of passages 60 which are advantageously calibrated. The chambers can be inflated e.g., with a fluid such as water. In steady conditions all the elementary chambers 50, which together form one deformable chamber as $813b_1$, are at the same pressure. In dynamic conditions the calibrated passages 60 result in a damping action which improves yawing comfort.

FIG. 8a shows a variant of the guiding means of FIG. 8, wherein a deformable inflatable chamber as $813a_1$ is embodied by a combination of more than one, e.g. two, hollow toroidal members 70 intercommunicating via passages 80.

The embodiments shown are of course only examples and can be modified, inter alia by the substitution of equivalent technical means, without departure from the scope of the invention. For instance, the bellows 50 of FIG. 8 and the member 70 of FIG. 8a could be replaced by hydraulic or pneumatic rams.

We claim:
1. In and for a transport system comprising a track and a machine adapted to move therealong, the track having at least one guiding surface having a vertical component, the machine comprising a structure having a surface near the guiding surface, ground effect guiding means for guiding the machine along the track, the guiding means comprising:

means for bounding fluid cushion enclosures between the machine structure and the guiding surface, said structure bearing on said surface by way of said enclosures, the enclosures together forming at least one group consisting of at least two fluid cushion enclosures disposed in consecutive relationship lengthwise of the machine;

at least one deformable chamber; means for bounding said deformable chamber between the machine structure surface and said group of fluid cushion enclosures, and means for securing all the fluid cushion enclosures of said group to said chamber;

means for supplying fluid to the fluid cushion enclosures; and means for supplying fluid to the said deformable chamber.

2. Guiding means according to claim 1 wherein the means for bounding the deformable chamber comprise a deformable longitudinal partition on the side near the guiding surface and wherein the securing means comprise means for securing the fluid cushion enclosures to the deformable longitudinal partition.

3. Guiding means according to claim 2 wherein the means for securing the fluid cushion enclosures to the deformable longitudinal wall comprise means which bound an individual deformable enclosure between each fluid cushion enclosure and such partition, the guiding means also comprising means for supplying pressure fluid to the individual deformable enclosures.

4. Guiding means according to claim 3 wherein the means for supplying fluid to the fluid cushion enclosures comprise means for supplying in series an individual deformable enclosure and the fluid cushion enclosure associated with such individual deformable enclosure.

5. Guiding means according to claim 1 wherein the means bounding the deformable chamber comprise a rigid longitudinal partition on the side near the machine structure surface.

6. Guiding means according to claim 5 wherein the longitudinal partition forms part of the machine structure.

7. Guiding means according to claim 5, also comprising means for bounding a deformable auxiliary compartment between the deformable chamber and the machine structure surface, and wherein the rigid longitudinal partition forms part of the means bounding the deformable auxiliary compartment.

8. Guiding means according to claim 7 further comprising a communicating orifice between the auxiliary compartment and the deformable chamber.

9. Guiding means according to claim 5 wherein the means for bounding the deformable chamber also comprise two flexible diaphragms which connect the deformable longitudinal partition to the rigid longitudinal partition and which are so disposed as to bear on the rigid longitudinal partition by way of a contact surface which alters progressively in response to deformations of the deformable chamber.

10. Guiding means according to claim 1 wherein the deformable chamber comprises at least two elementary deformable chambers which are disposed in consecutive relationship lengthwise of the machine; and at least one passage providing communication between the elementary deformable chambers.

11. Guiding means according to claim 10 wherein the passage is a calibrated orifice.

12. Guiding means according to claim 10 wherein the elementary deformable chambers comprise hollow, toroidal members.

13. Guiding means according to claim 10 wherein the elementary deformable chambers comprise flexible pockets.

14. Guiding means according to claim 10 wherein the elementary deformable chambers comprise bellows.

15. Guiding means according to claim 10 wherein the elementary deformable chambers comprise fluid-operated rams.

16. Guiding means according to claim 1 wherein the fluid supplying the deformable chamber is a liquid such as water.

17. Guiding means according to claim 1 wherein the fluid supplying the deformable chamber is a fluid of the same nature as the fluid supplying the fluid cushion enclosures.

18. Guiding means according to claim 1 further comprising means for providing a substantially sealing-tight closure of the deformable chamber.

19. Guiding means according to claim 17 further comprising a pressure fluid source connected to the deformable chamber and at least some of the fluid cushion enclosures.

20. Guiding means according to claim 19 further comprising a calibrated orifice between the pressure fluid source and the deformable chamber.

21. Guiding means according to claim 19 further comprising a convergent-divergent device between the pressure fluid source and the deformable chamber.

22. Guiding means according to claim 1 wherein the fluid cushion enclosures together form at least two groups of fluid cushion enclosures, such groups being disposed in consecutive relationship lengthwise of the machine, and wherein a respective deformable chamber is associated with each of the two groups, each of which thus forms the equivalent of a bogie.

23. Guiding means according to claim 1 in and for a transport system wherein the track has two opposite guiding surfaces each having a vertical component and the machine structure has two surfaces associated one each with the respective guiding surfaces, the guiding means comprising a deformable chamber associated with one surface of the machine structure, a deformable chamber associated with the other surface of the machine structure, and a calibrated orifice interconnecting the two deformable chambers.

* * * * *